May 19, 1925.  1,538,095
E. DEWOITINE
CONTROLLING DEVICE FOR VARYING THE INCIDENCE OF AEROPLANE STABILIZERS
Filed July 8, 1924
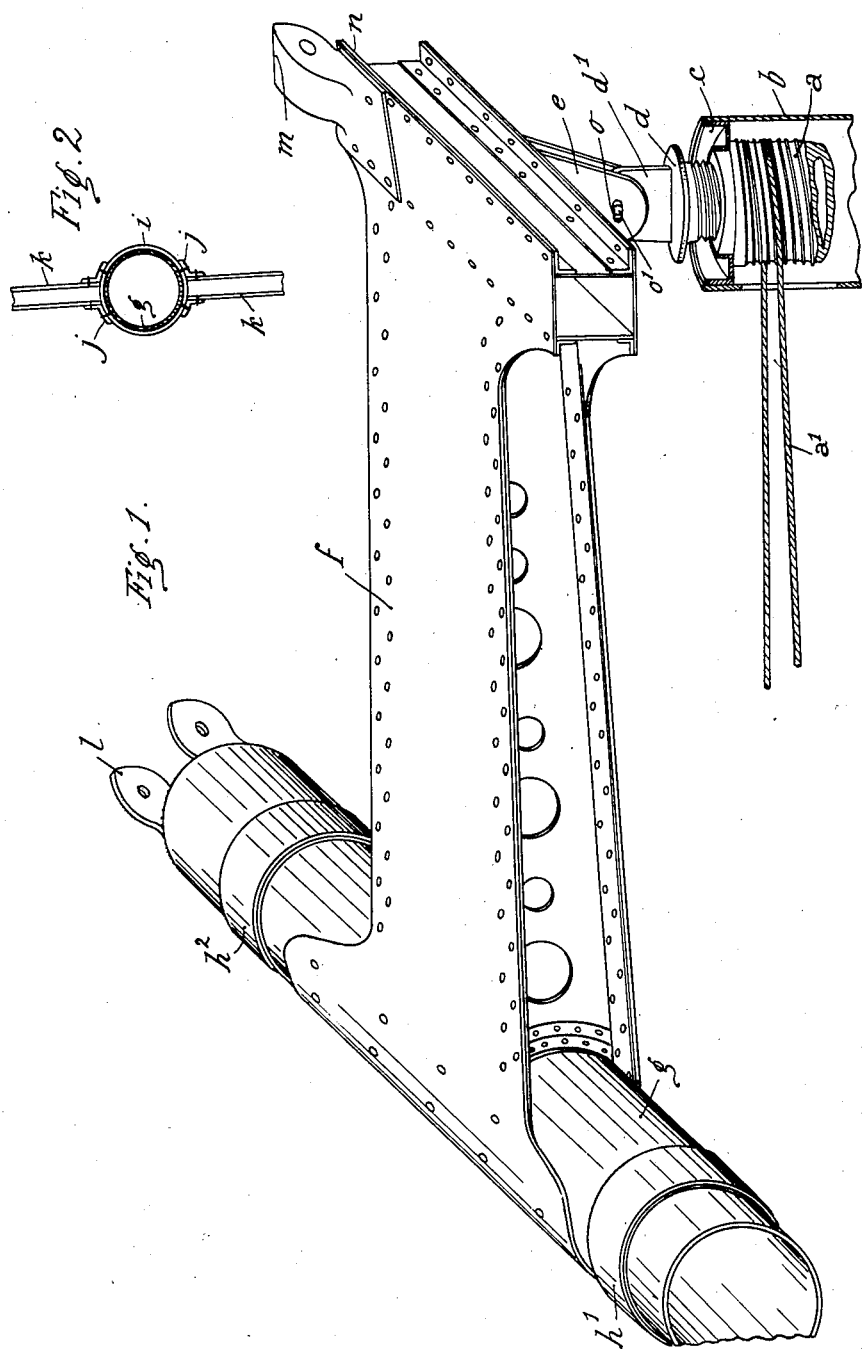

Patented May 19, 1925.

1,538,095

UNITED STATES PATENT OFFICE.

EMILE DEWOITINE, OF TOULOUSE, FRANCE.

CONTROLLING DEVICE FOR VARYING THE INCIDENCE OF AEROPLANE STABILIZERS.

Application filed July 8, 1924. Serial No. 724,854.

*To all whom it may concern:*

Be it known that I, EMILE DEWOITINE, a citizen of France, and a resident of Toulouse, Haute-Garonne Department, France, have invented certain new and useful Improvements in Controlling Devices for Varying the Incidence of Aeroplane Stabilizers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a device for the control of the incidence of the stabilizer upon aeroplanes, the said control providing for the slow, easy and reliable operation of the stabilizer, and offering a marked advantage in all cases in which the pilot is obliged to exercise a prolonged effort in order to hold the elevator in its position. This will be the case, for example, when an avion is improperly situated upon starting in flight, or an avion which loses its position due to the shifting of ballast or load, or on the other hand an avion flying at a height for which the proper balancing has not been provided. In such cases the pilot will simply follow with the hand the movements of the control stick or the hand-wheel and with the other hand operate for the gradual control of the stabilizer. The proper adjustment will be obtained when the elevator is in the wind's eye, and need only be carried out for the evolutions.

The controlling device according to the invention essentially comprises a nut which is rotated for instance by a cable and thus provides for the axial movement of a screw which is disposed within the said nut and is attached to a lever pivoted upon a horizontal axle situated in the aeroplane body, the said lever being secured to the longitudinal beams, which support the stabilizer planes in the overhung position.

The following description, together with the appended drawings which are given by way of example, sets forth the present invention.

Fig. 1 is a perspective view of the controlling device according to the invention.

Fig. 2 is a vertical section of the tube constituting the axle for the rotation of the stabilizer.

The said control device comprises a nut $a$ having upon the periphery a helical groove in which is wound the cable $a^1$; the forward motion of the nut is prevented by the annular shells $c$ disposed at either end of the said nut and secured within a case $b$ which is mounted upon the aeroplane body. Within the nut $a$ is a coacting screw $d$ whose head $d^1$ cooperates with the forked support $e$ of a lever arm of great strength $f$; the said head $d^1$ and the forked support are connected together for instance by the axle $o^1$ secured to the head $d^1$ and engaging in slots in the said forked support.

The lever $f$ comprises a member formed of sheet metal disposed around the tube $g$ whose centre line forms the axis of rotation of the lever; said tube is mounted by means of the annular bearings $h^1$ $h^2$ in a second tube $i$, Fig. 2, which is connected with the aeroplane body, to which it may be secured for instance by the angle brackets $j$, the other flange of the brackets being attached to the sheet metal of a two-part element $k$.

The tube $g$ is extended at either end by a longitudinal beam engaging at its ends with the lugs $l$, which for the sake of clearness are shown only at one end of the tube $g$; the said longitudinal beams, which support—in the overhung position—the planes or fins constituting the stabilizer, turn with the tube $g$ and hence control the said planes.

But this arrangement might occasion torsional stresses of an excessive nature in the longitudinal beams so that the stabilizer may be provided with a second longitudinal beam, each half of the beam being attached to a lug $m$ which is integral with the base plate $n$, only one of the said lugs being herein illustrated for the sake of clearness. In this event the second beam serves as the element imparting the motion of ascent and descent of the screw $d$ to all the ribs of the stabilizer, which latter will rotate upon the longitudinal beam secured to the tube $g$.

The said arrangement is operated in a very simple manner. The pilot acts upon the cable $a^1$, thus effecting the rotation of the nut $a$ and hence the vertical displacement of the screw $d$, whereby the lever $f$ is slowly rotated on the tube $g$.

Obviously, the said arrangement is susceptible of detail modifications, without departing from the spirit of the invention.

What I claim is:—

1. A controlling device for varying the incidence of the stabilizing planes in aviation apparatus, comprising a nut revoluble in the frame of the apparatus, means for controlling the rotation of the said nut, a screw disposed within the said nut, a lever pivoted at one end to the aviation apparatus, means connecting the other end of the said lever with the said screw, and means securing the said lever to the stabilizing planes.

2. A controlling device for varying the incidence of the stabilizing planes in aviation apparatus, comprising a nut revoluble in the frame of the apparatus, means for controlling the rotation of the said nut, a screw disposed within the said nut, a lever consisting of a sheet metal member wound upon a tube, said tube being revoluble in a second tube secured to the aviation apparatus and thus constituting the axle of rotation of the said lever, a forked connector secured to the other end of said lever, and axle connecting the said connector with the head of the screw and means securing the longitudinal beams supporting the stabilizing planes to the said lever.

3. A controlling device for varying the incidence of the stabilizing planes in aviation apparatus, comprising a nut revoluble in the frame of the apparatus, means for controlling the rotation of the said nut, a screw disposed within the said nut, a lever consisting of a sheet metal member wound upon a tube, said tube being revoluble in a second tube secured to the aviation apparatus and thus constituting the axle of rotation of the lever, a forked connector secured to the other end of said lever, an axle connecting the said connector with the head of the screw, connecting lugs attached to the ends of the said tube about which is wound the sheet metal member constituting the lever, and attaching members secured to the other end of the said lever and forming connectors for the longitudinal beams of the stabilizing planes.

4. A controlling device for varying the incidence of the stabilizing planes in aviation apparatus, comprising a nut revoluble in the frame of the apparatus, a helical groove formed on the periphery of the said nut, a cable cooperating with said groove, a screw disposed within the said nut, a lever consisting of a sheet metal member wound upon a tube, said tube being revoluble in a second tube secured to the aviation apparatus and thus constituting the axle of rotation of the lever, a forked connector secured to the other end of the said lever, an axle connecting the said connector with the head of the screw, connecting lugs attached to the ends of the said tube about which is wound the sheet metal member constituting the lever, and attaching members secured to the other end of the said lever and forming connectors for the longitudinal beams of the stabilizing planes.

In testimony that I claim the foregoing as my invention, I have signed my name hereto.

EMILE DEWOITINE.